United States Patent
Baudot et al.

(10) Patent No.: US 7,985,331 B2
(45) Date of Patent: Jul. 26, 2011

(54) METHOD FOR ELIMINATING THE CARBONYL SULFIDE CONTAINED IN A LIQUID HYDROCARBON STREAM

(75) Inventors: Arnaud Baudot, Lyons (FR); Renaud Cadours, Francheville (FR); Raphaël Huyghe, Lyons (FR); Elsa Jolimaitre, Lyons (FR); Pascal Mougin, Rueil Malmaison (FR); Eszter Toth, Lyons (FR)

(73) Assignee: Institut Francais du Petrole, Cedex (FR)

( * ) Notice: Subject to any disclaimer, the term of this patent is extended or adjusted under 35 U.S.C. 154(b) by 128 days.

(21) Appl. No.: 11/483,742

(22) Filed: Jul. 11, 2006

(65) Prior Publication Data

US 2007/0039854 A1 Feb. 22, 2007
US 2009/0127164 A9 May 21, 2009

(30) Foreign Application Priority Data

Jul. 11, 2005 (FR) ...................................... 05 07425

(51) Int. Cl.
*C10G 45/00* (2006.01)
*B01J 19/00* (2006.01)
*B01D 69/00* (2006.01)

(52) U.S. Cl. .................... 208/208 R; 208/211; 208/230; 208/232; 208/233; 208/234; 208/235; 210/321.6; 210/649; 422/239; 585/818

(58) Field of Classification Search ............ 208/208 R, 208/211, 230, 232, 233, 234, 235; 95/94; 210/321.6, 649; 422/239; 585/818

See application file for complete search history.

(56) References Cited

U.S. PATENT DOCUMENTS

| | | | |
|---|---|---|---|
| 3,956,112 A | 5/1976 | Lee et al. | |
| 4,070,165 A * | 1/1978 | Colton | ............................. 95/94 |
| 4,208,541 A | 6/1980 | McClure | |
| 4,290,879 A * | 9/1981 | Woodall et al. | ............... 208/232 |
| 5,271,835 A | 12/1993 | Gorawara et al. | |
| 5,424,051 A * | 6/1995 | Nagji et al. | ................... 423/234 |
| 6,207,121 B1 | 3/2001 | Rooney | |
| 2002/0139713 A1* | 10/2002 | Plummer et al. | .......... 208/208 R |
| 2004/0091409 A1 | 5/2004 | Allison | |

OTHER PUBLICATIONS

Li J-L et al. "Review of CO2 absorption using chemical solvents in hollow fiber membrane contactors" Separation and Purification Technology, Elsevier Science, Amsterdam, NL, vol. 41, No. 2 Feb. 2005, pp. 109-122.

* cited by examiner

Primary Examiner — Prem C Singh
(74) Attorney, Agent, or Firm — Antonelli, Terry, Stout & Kraus, LLP.

(57) ABSTRACT

The liquid hydrocarbon stream including COS is introduced via line 1 into membrane contactor CM to be placed in contact, through membrane M, with the aqueous alkanolamine solution arriving via line 3. The COS contained in the hydrocarbon stream is absorbed by the aqueous alkanolamine solution. The liquid hydrocarbons from which the COS has been removed are evacuated from CM via line 2. The aqueous solution containing COS is sent via line 4 to zone R to be regenerated. The compounds released during regeneration, particularly COS and COS-derived products, are evacuated from zone R via line 5. The regenerated aqueous alkanolamine solution is recycled via line 3 into membrane contactor CM.

9 Claims, 1 Drawing Sheet

METHOD FOR ELIMINATING THE CARBONYL SULFIDE CONTAINED IN A LIQUID HYDROCARBON STREAM

The present invention relates to the selective removal of carbonyl sulfide from a liquid hydrocarbon stream.

In the case of natural gas, three main treatment operations are considered: deacidification, dehydration, and stripping. The objective of the first operation is to remove acid compounds such as carbon dioxide ($CO_2$), hydrogen sulfide ($H_2S$), carbonyl sulfide (COS), and mercaptans, mainly methyl mercaptan, ethyl mercaptan, and propyl mercaptans. The specifications generally acknowledged for deacidified gas are 2% $CO_2$, 4 ppm $H_2S$, and 20 to 50 ppm total sulfur volume. The dehydration step then enables the water content of the deacidified gas to be controlled relative to transportation specifications. Finally, the natural gas stripping step guarantees the natural gas hydrocarbon dewpoint, which again is a function of transportation specifications.

In most cases, stripping is done by lowering the temperature. The hydrocarbons with at least three carbon atoms are condensed during cooling. A gas/liquid separator recovers both a gas essentially composed of methane and ethane, and hydrocarbons with carbon chains higher than ethane. During the stripping operation, the acid compounds still present in the gas are distributed between the gas and liquid effluents leaving the separating tank. Most of the sulfur compounds become concentrated in the liquid phase, however.

This liquid phase has to be treated eventually to meet the sulfur specifications generally imposed. A first step consists of first stabilizing this liquid hydrocarbon cut. The goal is to separate the hydrocarbon compounds with less than three carbon atoms co-absorbed in the liquid phase in the first separation unit. A second rectification step separates the hydrocarbons with at least 5 carbon atoms. During these liquid phase stabilization stages, the sulfur acid compounds are divided between the propane-butane phase and the C5+ phase. Due to concentration during processing, depending on the natural gas composition and the performance of the deacidification step, the level of sulfur compounds in this propane-butane cut may be as high as several thousand ppm of the total sulfur volume.

The presence of high concentrations of sulfur compounds in a liquid hydrocarbon stream can also be found in classical refining operations. In this case, the hydrocarbons considered have at least three carbon atoms.

These sulfur compound levels are distinctly higher than the specifications for liquid hydrocarbon cuts.

To reduce the sulfur compound level of a liquid hydrocarbon stream, it is known that caustic washing may be done. When the hydrocarbon stream is made to contact a concentrated sodium hydroxide solution, between 10 and 20 wt. %, in a counter-current flow in a plate column, all the sulfur compounds such as COS and mercaptans are eliminated. The mercaptans react with the sodium hydroxide to give mercaptides, which are then oxidized in the presence of a catalyst present in the solvent to give disulfides, while regenerating the caustic solution. These disulfides are then separated from the aqueous phase by decantation. The presence of COS, on the other hand, is problematic because the COS reaction with the sodium hydroxide according to the general reaction $COS + 4\,NaOH \rightarrow Na_2CO_3 + Na_2S + 2H_2O$ leads to formation of salts that cannot be regenerated during the oxidation step. The result is a substantial loss of solvent by chemical breakdown. Also, the salts thus formed accumulate in the solvent. They are eliminated by purging, which involves not only solvent losses but also catalyst losses.

The trend in treating liquid hydrocarbon streams is toward increasing richness in mercaptans and COS. While, from the technical standpoint, elimination of mercaptans by caustic washing does not appear to pose a problem, the presence of COS in increasing quantities requires the COS to be eliminated upstream of this sodium hydroxide washing to prevent a buildup of salts formed by the reaction between the COS and the caustic.

The goal of the present invention is to eliminate the COS contained in a liquid hydrocarbon stream by placing the liquid hydrocarbon stream in contact with an aqueous alkanolamine solution by means of a membrane contactor. The goal is selective elimination of COS relative to the mercaptans present in the stream.

The present invention relates to a method for eliminating the carbonyl sulfide contained in a liquid hydrocarbon stream wherein the stream and an aqueous alkanolamine solution are introduced into a membrane contactor provided with at least one membrane, the aqueous alkanolamine solution being separated from the stream by said at least one membrane chosen such that the carbonyl sulfide contained in the stream migrates into the aqueous solution, and wherein the aqueous solution containing carbonyl sulfide and the carbonyl sulfide-impoverished liquid hydrocarbon stream are evacuated from the membrane contactor.

In the method according to the invention, the carbonyl sulfide-impoverished liquid hydrocarbon stream can be made to contact a solvent containing sodium hydroxide in order to capture the mercaptans contained in the stream. Moreover, the aqueous solution containing carbonyl sulfide can be regenerated by distillation.

The aqueous alkanolamine solution can have between 50 and 80 wt. % water and between 20 and 50 wt. % alkanolamines. The aqueous alkanolamine solution can have at least one of the following alkanolamines: MEA (MonoEthanolAmine), 2-(2-aminoethoxy)ethanol, DEA (DiEthanolAmine), DIPA (DiIsoPropanolAmine), MDEA (MethylDiEthanolAmine), and TEA (TriEthanolAmine).

In the method according to the invention, prior to the contact in the membrane contactor, the stream can be made to contact an absorbent liquid such that the liquid absorbs the $H_2S$ and $CO_2$ contained in the stream.

According to the invention, said liquid hydrocarbon stream can be at least a part of a liquid condensate obtained by a natural gas treatment process comprising the following steps:
  a) the natural gas is made to contact an absorbent liquid so as to absorb the $CO_2$ and $H_2S$ and obtain a purified natural gas,
  b) the purified natural gas is dehydrated,
  c) the dehydrated natural gas is cooled so as to obtain said liquid condensate and a gas fraction.

The present invention also has a device for eliminating the carbonyl sulfide contained in a liquid hydrocarbon stream, comprising a membrane contactor provided with at least one membrane, a pipe for introducing the stream into the contactor, and a pipe for introducing an aqueous alkanolamine solution into the contactor, the stream being separated from the aqueous solution in the contactor by said at least one membrane chosen such that the carbonyl sulfide contained in the stream migrates into the aqueous solution; the device additionally has a pipe for evacuating the aqueous solution containing carbonyl sulfide and a pipe for evacuating the carbonyl sulfide-impoverished liquid hydrocarbon.

According to the invention, the membrane can be permeable to carbonyl sulfide such that the carbonyl sulfide migrates from the stream to the aqueous solution through the membrane.

The membrane can be porous and is wetted by the stream or the aqueous solution. Alternatively, the membrane can be porous and be wetted by a liquid different from the stream and the aqueous solution.

The membrane can have one of the following shapes: plane, tubular, spiral, or monolith shaped.

The membrane material can be chosen from: ceramic, polypropylene and polytetrafluoroethylene.

The contact surface per unit volume of the contactor can be between 1500 $m^2/m^3$ and 7000 $m^2/m^3$.

Using a membrane contactor to bring about contact between the liquid hydrocarbon stream and the aqueous alkanolamine solution has a number of advantages.

The membrane contactor provides a rigid interface between the aqueous alkanolamine solution and the stream of hydrocarbons to be treated, preventing dispersion from one phase to the other and hence preventing formation of an emulsion between the aqueous alkanolamine solution and the liquid hydrocarbon stream.

Moreover, the flowrates of the aqueous alkanolamine solution and the hydrocarbon stream to be treated can be chosen independently of each other.

In addition, the membrane contactors offer a large interfacial contact area.

Other characteristics and advantages of the invention will be better understood and will emerge clearly from reading the description below with reference to the drawings.

Figure 1:
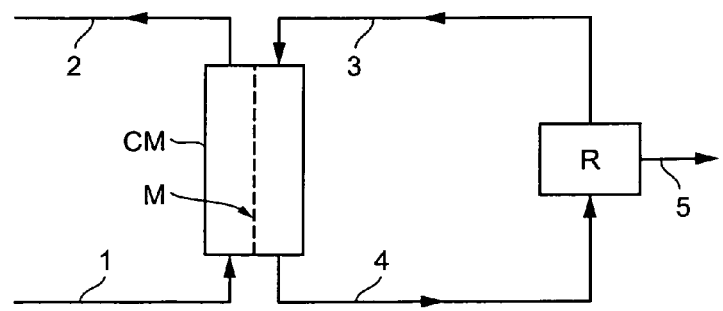
FIG. 1 shows schematically a process according to the invention.

In FIG. 1, the hydrocarbon stream to be treated arrives via pipe 1. This liquid hydrocarbon stream may comprise ethane, propane, butane, pentane, COS in general at a level of lower than 1 vol. %, and mercaptans at a level of lower than 2 vol. %. The temperature of this stream is often determined such as to keep the system pressure lower than 30 bars as far as possible. The hydrocarbon stream can be at a temperature between 30° C. and 80° C. and at a pressure higher than its bubble point.

The hydrocarbon stream arriving via pipe 1 is introduced into membrane contactor CM to be brought into contact, through membrane M, with the liquid aqueous alkanolamine solution introduced into the contactor via pipe 3. According to the invention, as a result of the reaction between the COS and the alkanolamines, the COS contained in the hydrocarbon stream is taken up by the alkanolamines in the aqueous solution. These basic compounds, particularly the primary or secondary amines, react with the COS in reactions whose kinetics are such that the reaction with the COS is essentially located in the diffusional film in the aqueous phase. Hence, optimization of the contact surface between the hydrocarbon phase to be purified and the aqueous alkanolamine solution favors the effectiveness of COS take-up.

Moreover, the absence of a chemical reaction between the mercaptans and the alkanolamines limits the quantity of mercaptans absorbed by physical solubility in the aqueous alkanolamine solution and thus enables the COS to be eliminated selectively relative to the mercaptans. The elimination selectivity of carbonyl sulfide relative to the mercaptans is readily explained from the basicity scale of the various species. The pKa values of the principal alkanolamines used for natural gas treatment are between 8.5 for MEA and 9.5 for MDEA, at 20° C. The mercaptans have low acidity. Hence, absorption of the mercaptans in the aqueous alkanolamine solutions is essentially confined to physical absorption of the sulfur compound in an aqueous solution. The COS, on the other hand, hydrolyzes in the presence of water. This hydrolysis reaction is catalyzed by the presence of a base, in this case the alkanolamine. COS hydrolysis leads to formation of $CO_2$ and $H_2S$ which react with the alkanolamine. As a result, COS absorption is favored by these chemical reactions.

The aqueous alkanolamine solution contains water, for example in a proportion between 50 wt. % and 80 wt. %, and one or more alkanolamines, for example in a proportion between 20 wt. % and 50 wt. %. The alkanolamine can be a primary alkanolamine, for example MEA (MonoEthanolAmine), 2-(2-aminoethoxy)ethanol, DEA (DiEthanolAmine), DIPA (DiIsoPropanolAmine), MDEA (MethylDiEthanolAmine), or TEA (TriEthanolAmine). Preferably, a primary or secondary alkanolamine is chosen to favor COS hydrolysis. The use of amine mixtures, particularly tertiary amines with primary and/or secondary amines, is an alternative to a primary or secondary amine solution. In this mixture, the primary and/or secondary amine of the mixture plays the role of kinetic activator when COS is absorbed.

In the contactor CM, the streams can circulate in a co-current or counter-current flow as shown in FIG. 1.

In the contactor CM, the membrane M separates the liquid aqueous solution flow from the liquid hydrocarbon stream flow. The membrane can have different geometries. For example, the membrane can have a plane surface, a tubular shape, i.e. generally in the form of tubes with diameters greater than 5 mm, or hollow fibers, i.e. in the form of tubes with diameters less than 5 mm.

Membrane M can immobilize or possibly separate the interface between the aqueous solution and the stream to be treated, preventing dispersion from one phase to another. This method avoids the costs of dispersion from one phase to another linked to the pumping of fluids and the additional energy supplied to the fluids to create turbulence in order to increase their interfacial area (in the case where one of the phases is amphiphilic, this agitation has the drawback of causing emulsions to form, which may clog the units) as well as avoiding the costs of post-treatment by a decanter or coalescer (separation of the phases after dispersion may be difficult and require cumbersome separation means such as centrifugation, whose unit operation is particularly maintenance-intensive). Also, the separation between the aqueous solution and the stream to be treated prevents dispersion of water into the stream.

In addition, the circulation flows of the phase to be extracted and of the solvent on either side of the membrane can be chosen independently of each other, contrary to conventional contactors such as columns. With the latter type of geometry, the "extraction phase flowrate/solvent flowrate" ratio must be less than a boundary value to prevent any entrainment from one phase to another.

Finally contrary to packed columns, the operation of membrane contactors is insensitive to movements of the contactor, for example generated by pitching and rolling phenomena. This property, linked to the high compactness of the membrane contactors, make it a technology particularly suitable for use on offshore platforms.

For the hollow-fiber membrane contactors, the interfacial area between the two phases is distinctly greater than those developed by any conventional equipment, so that extraction by the solvent is maximized. In general, the order of magnitude of the interfacial areas, the contact surface between the two phases per unit of total volume of the two phases brought into contact, generally observed with the various types of existing contactors, is 3 to 30 $m^2/m^3$ for free dispersion columns, 30 to 300 $m^2/m^3$ for packed or plate columns, and 160 to 500 $m^2/m^3$ for mechanically agitated columns. The hollow fiber membrane contactors offer interfacial area values between 1600 and 6500 $m^2/m^3$. The hollow fiber membrane contactor thus offers an obvious technological advantage. This advantage is all the greater in that the transfer kinetics between the two phases is slow. This is because the extraction kinetics are above all dependent on the product of two dissociated operating parameters: first, the overall transfer coefficient between the two phases 'k' (expressed in m/sec), the kinetic transfer component dependent on (among other things) the flow conditions of the two phases, and the diffusion coefficient of the species to be extracted in the phases brought together, and second the interfacial area 'a') expressed in $m^2/m^3$), a geometric datum intrinsic to the system. As an example, one may cite the comparative values of the product 'k×a' for different types of contactors. The values of 'k×a' observed in the columns remain small: $7\times10^{-4}$/sec for a rotating column or $0.5\times10^{-4}$/sec for a single dispersion column. The published values for hollow fiber contactors are far higher: $10\times10^{-4}$/sec to $2000\times10^{-4}$/sec.

The contacting in contactor CM takes place through membrane M according to one of the methods described below.

In a first method, the two phases circulate one on each side of a dense membrane permeable to COS. This is the principle known, depending on the application, as dialysis or pertraction described in patents U.S. Pat. No. 3,957,504 and U.S. Pat. No. 3,956,112.

In a second method, the two phases circulate one on each side of a porous membrane. Usually, the membrane is wetted by one of the two phases brought into contact. The interface between the two phases is then located on the "mouths" of the pores at the surface of the membrane in contact with the non-wetting phase and is immobilized in this location due to capillarity forces at a counter-pressure brought into play on the non-wetting phase site, also called yield pressure. For example, one can use a "hollow fiber" type membrane, for example the polypropylene hollow fibers sold by the company Celgard (Celgard, 13800 South Lakes Drive, Charlotte, Nc. 28273, United States) or the PTFE (polytetrafluoroethylene) based fibers sold by W. L. Gore & Associates (Elkton, Md.). It is also possible to use porous ceramic membranes that generally have high chemical and heat resistance, particularly those based on pure oxides such as alumina, zirconia, or titanium oxide, or oxide mixtures. In particular, membrane contactors using hollow fibers based on alumina such as those produced by the companies Inocermic (Inocermic GmbH, Marie-Curie-Strasse 17, D-07629 Hermsdorf/Thüringen, Germany) or Ceparation (Ceparation BV Business Centre Carré, Steenovenweg 5,5708 HN Helmond, Netherlands) may be used. Other shapes such as monoliths may also be suitable as they offer particularly compact geometries.

The COS-containing aqueous alkanolamine solution is evacuated from the contactor CM via pipe 4, then introduced into the regeneration zone R. This COS-containing solution, possibly partially hydrolyzed with $H_2S$ and COS and mercaptans, is then regenerated in zone R classically according to techniques classically employed, for example by expansion and/or by distillation. The compounds released during regeneration, particularly COS in all its forms and possible the mercaptans, are evacuated from zone R via pipe 5. The regenerated aqueous alkanolamine solution is then recycled, being reintroduced via pipe 3 into contactor CM. For example, the aqueous alkanolamine solution is regenerated in a distillation column at a pressure between 1 and 3 bars, the bottom temperature of the column being between 120° C. and 140° C., and the top temperature being between 40° C. and 60° C. at the condenser.

The example presented below illustrates the process shown schematically in FIG. 1. This example shows that the present invention does indeed eliminate the COS contained in a liquid hydrocarbon cut while minimizing the quantity and volume of equipment.

For the example, we consider a liquid hydrocarbon stream arriving via pipe 1, essentially composed of propane and butane, 98 vol. %, in which hydrocarbons containing less than two carbon atoms, or more than five carbon atoms, are still present as minorities—between 1 and 2 vol. %. The stream contains 300 ppm by volume of COS as well as 500 ppm by volume of mercaptans.

The stream is brought into contact, in the contactor CM, with an aqueous diethanolamine solution, 35 wt. %, available at 40° C.

The membrane contactor CM allows for contact between the phases. The contactors currently on the market develop exchange areas of between 2000 and 3500 $m^2/m^3$. Due to the diffusional limits linked to the membrane contactor technology, particularly at the liquid-liquid interface, the resistances to transfer in the case of membrane contactors are greater than those characteristic of packed columns. However, the product of the transfer coefficient and the contactor exchange area remains far higher in the case of the membrane contactor: $400\times10^{-4}$/sec for a packed counter-current contactor and $2000\times10^{-4}$/sec for a membrane contactor.

With the above product, the savings in overall equipment size are obvious. To them is added the advantage of the membrane contactor which requires no phase redistribution system in the contactor as is often done for packings. According to the recommendations in the literature, 4 to 5 beds are generally considered in a packed column, involving phase redistribution each time. This also results in a decrease in overall size in the case of the membrane contactor for a given degree of COS elimination generally obtained, i.e. between about 70% and 90%.

Moreover, the implementation of a membrane contactor makes it unnecessary to use phase separation equipment located downstream of the contactor, such as coalescers, since the membrane contactor eliminates all phase mixing upon contact.

When a liquid hydrocarbon stream containing COS and mercaptans is being treated, it is useful to employ the process shown schematically in FIG. 1 upstream of a caustic washing unit.

Figure 2:
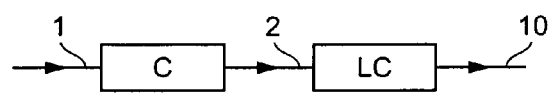
FIGS. 2 and 3 show two processes according to the invention for desulfurizing a liquid hydrocarbon stream.

With reference to FIG. 2, the liquid hydrocarbon stream containing mercaptans and COS is introduced via pipe 1 into a contacting unit C to be placed in contact with an aqueous alkanolamine solution. Unit C can operate according to the method described with reference to FIG. 1, with the pipes 1 and 2 in FIG. 2 corresponding to the pipes 1 and 2 in FIG. 1. The liquid hydrocarbon stream evacuated from unit C through pipe 2 is COS-impoverished.

The stream is then introduced through pipe 2 into caustic washing unit LC. It is made to contact a solution including sodium hydroxide. The caustic solution captures the mercaptans present in the hydrocarbon stream. For example, unit LC can use the methods referred to below. U.S. Pat. Nos. 4,207, 173 and 4,490,246 use a catalyst based on phthalocyanine in the presence of a base and oxygen. The base used is tetraalkylguanidine to convert the mercaptans into disulfides. For elimination of the mercaptan in the liquid phase, U.S. Pat. No. 4,029,589 recommends mixing the hydrocarbon cut with halides (iodides, bromides, etc.) or complexing agents such as amines and carboxylic acids. Likewise, U.S. Pat. No. 4,383, 916 uses an oxide catalyst in the presence of methanol to eliminate the mercaptans. U.S. Pat. Nos. 4,459,205 and 4,466,906 use a metal complex of polyaminoalkylpolycarboxylic acid deposited on an ion exchange resin to convert the mercaptans into disulfides. The stream from unit LC is mercaptan and COS impoverished.

The fact of having separated the COS from the hydrocarbon stream downstream of caustic washing enables the caustic washing to be done without buildup of salts formed by reactions between the base and the COS.

Figure 3:
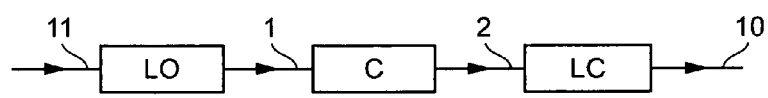

FIG. 3 offers a method for treating a liquid hydrocarbon stream including acid compounds such as $CO_2$, $H_2S$, COS, and mercaptans.

The stream to be treated, arriving through pipe 11, is introduced into the washing unit LO by a solvent absorbing $CO_2$ and $H_2S$. The solvent can have a physical, chemical, or hybrid nature, combining the physical and chemical characteristics. The solvent with a physical characteristic can be glycol ether, methanol, morpholine, and its derivatives. Preferably, a chemical solvent is used to limit hydrocarbon losses by co-absorption. The chemical solvent can be an aqueous amine or alkanolamine solution. Since the goal is total deacidification, the primary or secondary amines can be used, or tertiary amines activated by a primary or secondary amine. A hybrid solvent is obtained by mixing a physical solvent with a chemical solvent. Contacting is performed in a classical liquid-liquid contactor, for example a bubble column, a plate column, a packed column, bulk or structured, or reactors agitated in series. The solvent absorbs the $CO_2$ and $H_2S$. The hydrocarbon stream evacuated from unit LO via pipe 1 is $CO_2$ and $H_2S$ impoverished, but still contains COS and mercaptans.

This stream coming from unit LO is then treated in unit C then LC in the same manner as described with reference to FIG. 2.

The principle of the invention can also be applied to treat a gasoline fraction produced when treating a natural gas.

Figure 4:
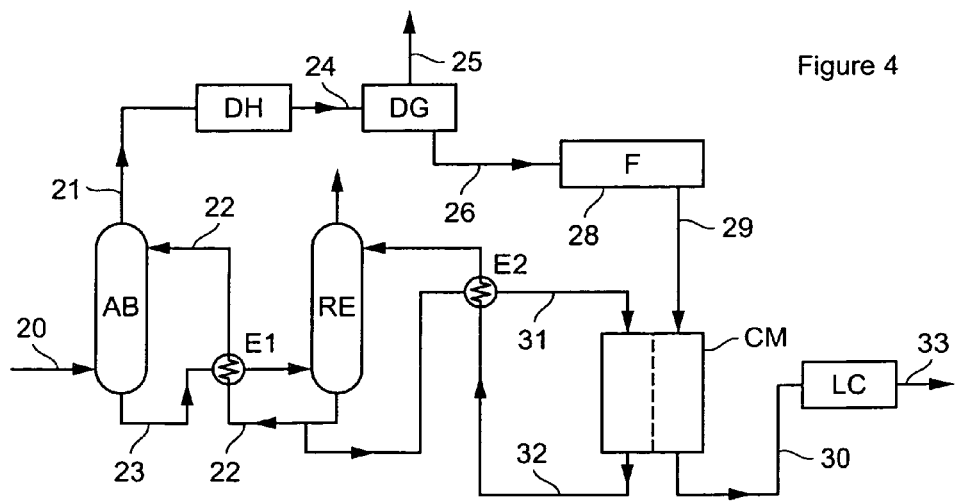
FIG. 4 shows a method for implementing the present invention in the framework of treating natural gas.

With reference to FIG. 4, the natural gas arriving via pipe 20 is introduced into absorption column AB so that it can contact an aqueous solution containing alkanolamines arriving via pipe 22. The solution absorbs the $CO_2$ and $H_2S$ contained in the natural gas. The aqueous alkanolamine solution can pick up about 80% of the COS and about 40% of the mercaptans. The aqueous alkanolamine solution containing $CO_2$ and $H_2S$ is evacuated at the bottom of column AB through pipe 23, reheated in the indirect heat exchanger E1, then introduced into the distillation column RE. The regenerated aqueous alkanolamine solution, i.e. containing no $CO_2$ or $H_2S$ compounds, is evacuated at the bottom of column RE via pipe 22, cooled in E1 by heat exchange with the stream circulating in pipe 23, then reintroduced into column AB.

The $CO_2$ and $H_2S$ impoverished gas is introduced into the dehydration section DH to absorb the water contained in the natural gas. The gas is treated by a dehydration process, for example with a glycol solution. For example, the dehydration process is that described in French Patent 2,740,468. The glycol used can be triethylene glycol (TEG).

The dehydrated gas produced by unit DH is introduced via pipe 24 into stripping unit DG to separate a gas cut containing a majority of methane and ethane evacuated via pipe 25 and a liquid hydrocarbon cut containing three or more carbon atoms. This liquid cut is produced by condensation of some of the dehydrated gas. Condensation is achieved by cooling. The liquid hydrocarbon fraction is sent via pipe 26 to fractionation unit F to be separated into different hydrocarbon cuts, for example by distillation. The liquid hydrocarbon fraction can be separated to obtain a propane and butane cut evacuated through pipe 29 and a heavy hydrocarbon cut containing more than five carbon atoms evacuated through pipe 28. The COS and mercaptans are distributed into the various cuts coming from fractionation unit F. Under specific conditions, the mercaptans can be concentrated in the propane and butane cut.

According to the invention, the liquid propane and butane cut is brought into contact, in membrane contactor CM, with an aqueous alkanolamine solution arriving via pipe 31. The membrane contactor CM designates the same element as that described with reference to FIG. 1. In membrane contactor CM, the aqueous solution absorbs the COS contained in the liquid propane and butane cut. The aqueous alkanolamine solution containing COS is evacuated through pipe 32, heated in heat exchanger E2, then introduced into distillation column RE. The regenerated aqueous alkanolamine solution is evacuated at the bottom of column RE, cooled in E2 by exchange with the stream circulating in pipe 32, then introduced into membrane contactor CM.

The liquid propane and butane cut, COS impoverished, is evacuated from membrane contactor CM through pipe 30 then introduced into caustic washing unit CL. Caustic washing eliminates the mercaptans present in the propane and butane cut. The propane/butane cut evacuated through pipe 33 can have a sulfur equivalent content less than 5 ppm.

Without departing from the framework of the invention, the treatment to which the stream circulating in pipe 29 is subjected can also be applied to the stream circulating in pipe 28 or directly to the stream circulating in pipe 26 before fractionation in unit F.

The invention claimed is:

1. Method for eliminating carbonyl sulfide contained in a liquid hydrocarbon stream that is at least a part of a liquid condensate obtained by a natural gas treatment process comprising the following steps:
   a) the natural gas is made to contact an absorbent liquid so as to absorb $CO^2$ and $H^2S$ and obtain a purified natural gas,
   b) the purified natural gas is dehydrated,
   c) the dehydrated natual gas is cooled so as to obtain the liquid condensate and a gas fraction, and
   d) the liquid condensate and an aqueous alkanolamine solution are introduced into a membrane contactor provided with at least one porous membrane, the aqueous alkanolamine solution being separated from the liquid condensate by the at least one porous membrane and being brought into contact with the liquid condensate at interfaces located on pores at the surface of the at least one porous membrane such that the carbonyl sulfide contained in the liquid condensate migrates into the aqueous solution having between 50 and 80 wt. % water and between 20 and 50 wt. % alkanolamines, and wherein the aqueous solution containing carbonyl sulfide and the carbonyl sulfide-impoverished liquid condensate are evacuated from the membrane contactor.

2. Method according to claim 1, wherein the carbonyl sulfide-impoverished liquid condensate is made to contect a solvent containing sodium hydroxide in order to capture the mercaptans contained in the stream.

3. Method according to claim 1, wherein the aqueous solution containing carbonyl sulfide is regenerated by distillation.

4. Method according to claim 1, wherein the aqueous alkanolamine solution has at least on of the following alkanolamines: MEA (MonoEthanolAmine), 2-(2-aminoethoxy) ethanol, DEA (DiEthanolAmine), DIPA (DilsoPropanolAmine), MDEA (MethylDiEthanolAmine), and TEA (TriEthanolAmine).

5. Method according to claim 1, wherein, prior to the contact in the membrane contactor, the liquid condensate is made to contact an absorbent liquid such that the liquid absorbs the $H^2S$ and $CO^2$ contained in the stream.

6. Method according to claim 1, wherein the membrane is permeable to carbonyl sulfide such that the carbonyl sulfide migrates from the stream to the aqueous solution through the membrane.

7. Method according to claim 1, wherein the membrane has one of the following shapes: plane, tubular, spiral, or monolith shaped.

8. Method according to claim 1, wherein the membrane material is chosen from: ceramic, polypropylene and polytetrafluoroethylene.

9. Method according to claim 1, wherein the contact surface per unit volume of the membrane contactor is between $1500 \text{ m}^2/\text{m}^3$ and $7000 \text{ m}^2/\text{m}^3$.

* * * * *